United States Patent [19]

Snyder

[11] Patent Number: 5,271,364
[45] Date of Patent: Dec. 21, 1993

[54] ROTARY INTERNAL COMBUSTION ENGINE

[76] Inventor: Duane P. Snyder, 50241 8th Ave., Grand Junction, Mich. 49056

[21] Appl. No.: 941,313

[22] Filed: Sep. 4, 1992

[51] Int. Cl.⁵ ............................. F02B 53/00
[52] U.S. Cl. .................... 123/241; 418/104; 418/188; 418/196
[58] Field of Search ........... 123/241, 245, 246; 418/91, 94, 188, 196, 104

[56] References Cited

U.S. PATENT DOCUMENTS

| | | | |
|---|---|---|---|
| 710,756 | 10/1902 | Colbourne | 123/241 |
| 1,349,882 | 8/1920 | Homan | 418/196 |
| 2,097,881 | 11/1937 | Hopkins | 418/183 |
| 3,439,654 | 4/1969 | Campbell | 123/12 |
| 3,809,026 | 5/1974 | Snyder | 123/847 |
| 4,018,548 | 4/1977 | Berkowitz | 418/61 A |
| 4,297,006 | 1/1967 | Marshall | 123/13 |
| 4,934,325 | 6/1990 | Snyder | 123/246 |
| 4,968,234 | 11/1990 | Densch | 418/104 |

FOREIGN PATENT DOCUMENTS

| | | |
|---|---|---|
| 938224 | 12/1955 | Fed. Rep. of Germany . |
| 2415406 | 10/1974 | Fed. Rep. of Germany . |
| 2429376 | 1/1976 | Fed. Rep. of Germany . |
| 1128173 | 1/1957 | France . |
| 2311200 | 1/1977 | France . |
| 448521 | 5/1965 | Japan . |
| 9431 | 6/1915 | United Kingdom ............... 418/196 |

Primary Examiner—Richard A. Bertsch
Assistant Examiner—Charles G. Freay
Attorney, Agent, or Firm—James Creighton Wray

[57] ABSTRACT

An engine of the internal combustion type having a plurality of cooperating adjacent parallel rotors of elliptical cross section having hollow interior flow passages communicating thru hollow supporting shafts forming a combustion chamber having a varying volume which depends upon the rotational position of the rotors. Each rotor has a second flow passage opening thru its interior surface communicating thru to slots at one apex of its major axis so as to provide valving for the combustion changer.

21 Claims, 3 Drawing Sheets

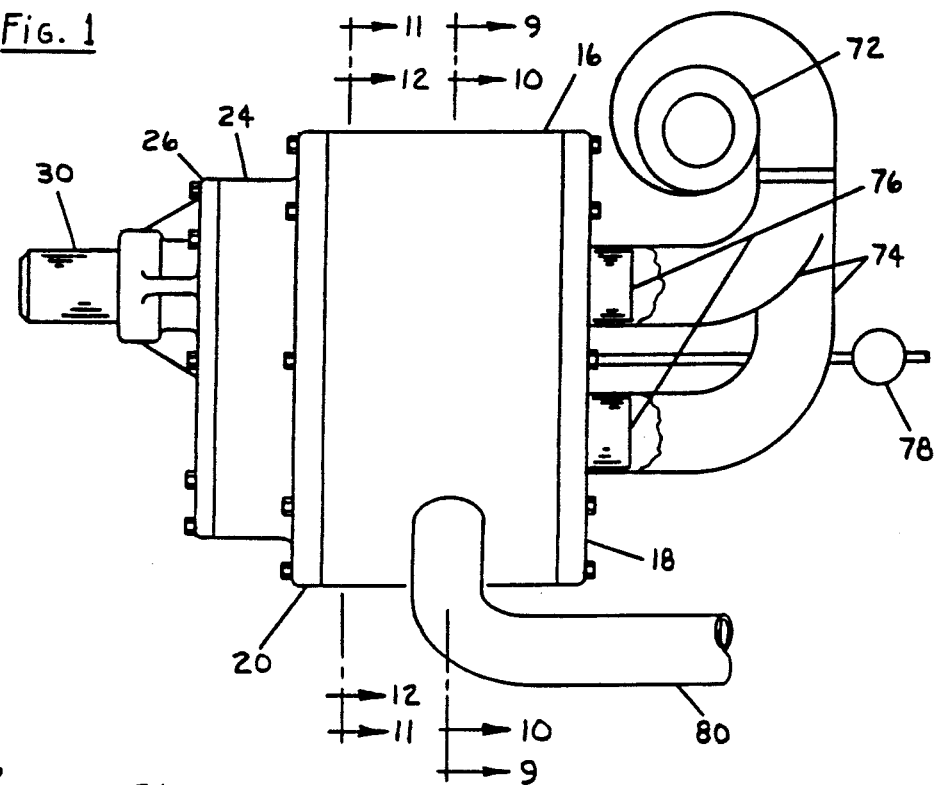
Fig. 1
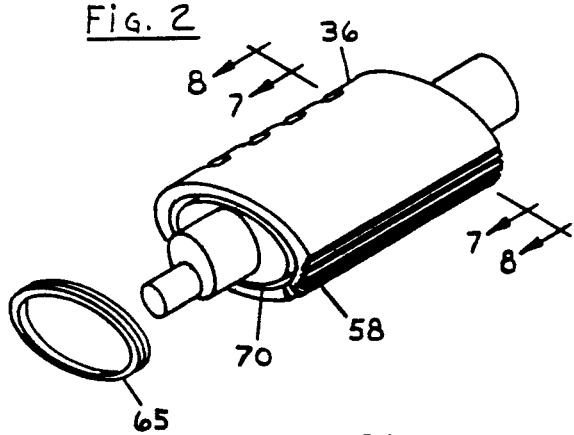
Fig. 2
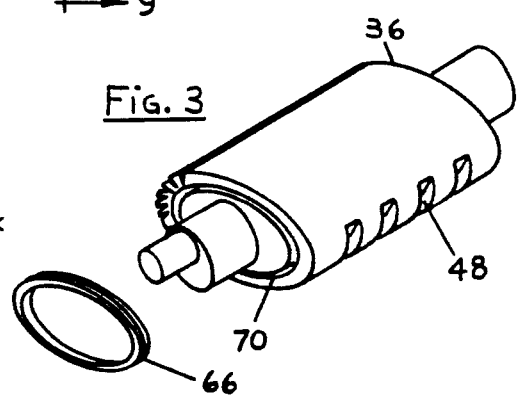
Fig. 3
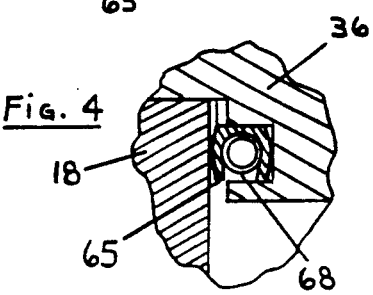
Fig. 4
Fig. 5

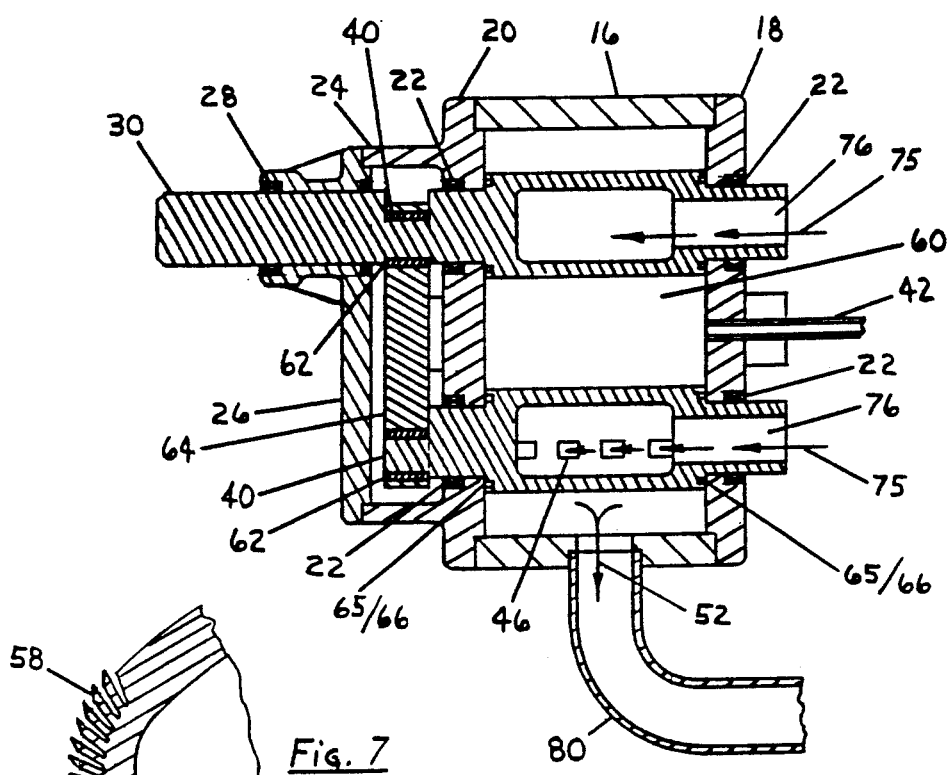
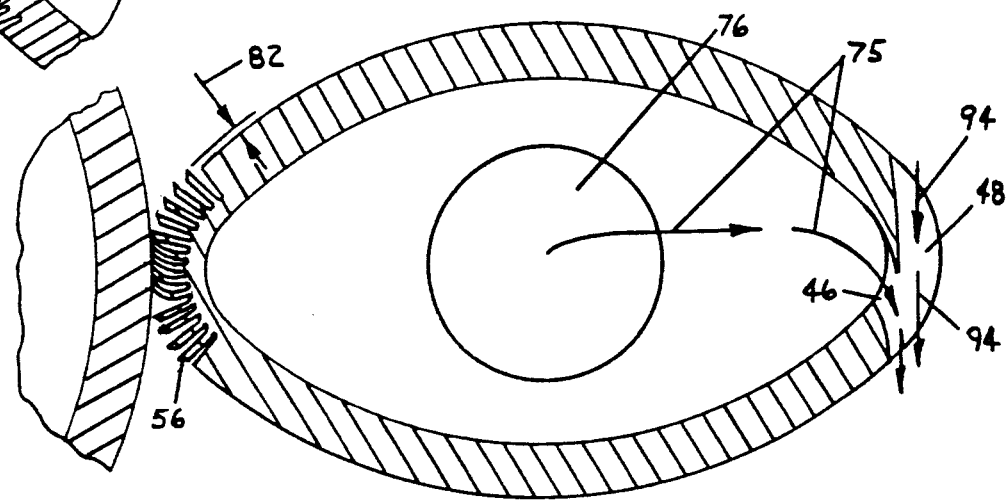

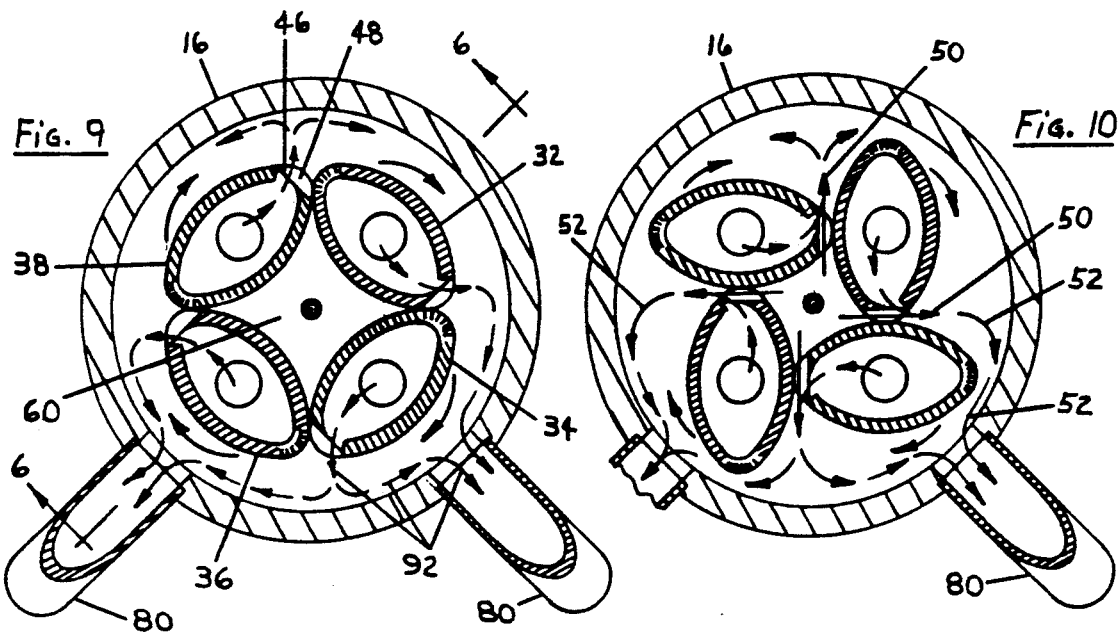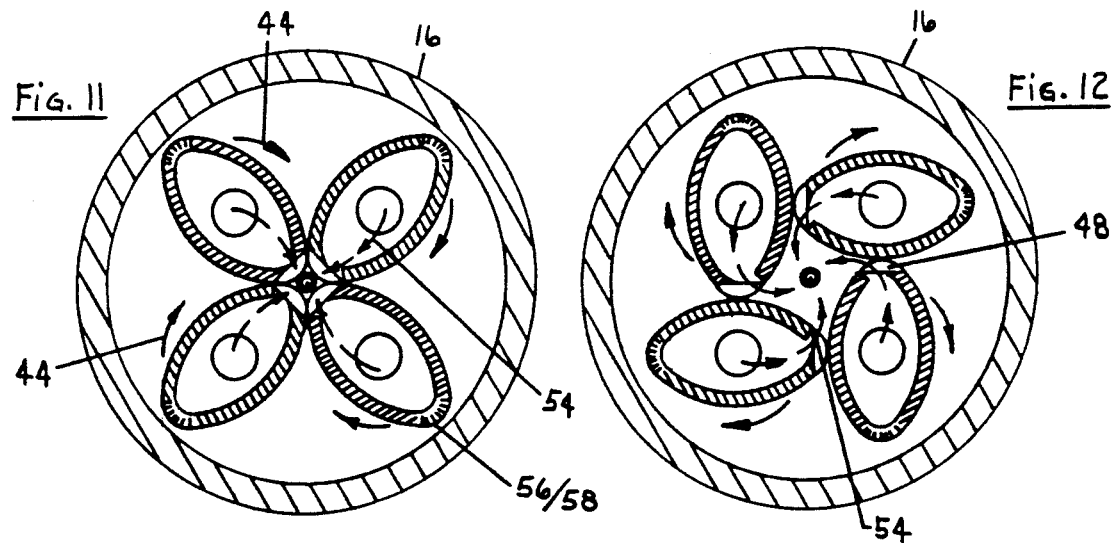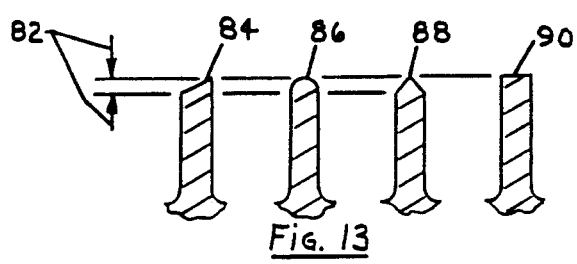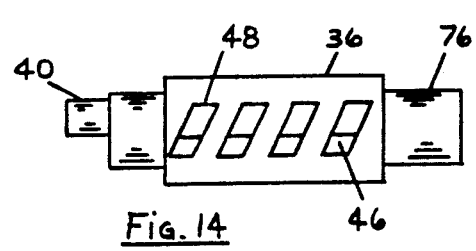

ROTARY INTERNAL COMBUSTION ENGINE

This invention relates to improvements in a rotary internal combustion engine.

This invention resides in improved arrangement of parts similar to those shown in my U.S. Pat. No. 3,809,026 and my U.S. Pat. No. 4,934,325.

BACKGROUND OF THE INVENTION

Prior art engines have utilized elongated co-acting rotors of elliptical cross section to define combustion changers that expand and contract as they rotate in unison. Hollow rotors with hollow supporting shafts have been used, with intake ports formed thru the sides of part of the rotors, and exhaust ports formed thru others of the rotors. Other engines have circulated cooling liquid thru hollow rotors, still others have circulated cooling air thru hollow rotors.

SUMMARY OF THE INVENTION

This invention relates to an internal combustion engine and has specific application to a rotary engine.

The rotary engine of this invention includes a plurality of rotors rotatable within a housing about parallel axes. Each of the rotors is of an elliptical cross sectional configuration and cooperates with three other such rotors to define a combustion chamber of varying volume depending upon the rotational position of the rotors. All of the rotors are continually supplied with cooling air from a blower passing thru hollow rotor shafts to the interior of the rotor. All of these rotors have intake ports formed thru the interior surface of the hollow rotors at one of their apexes to intake/exhaust slots located at the exterior of the same apex. These dual action intake and exhaust valve slots providing directing and encouraging the swirling action of the combustion chamber gases for improved ignition and combustion of such gases and providing a mixing of exhaust gases with fresh intake air for afterburning of exhaust gases to reduce pollution emmisions. The invention utilizes integral flexible wiper seals and elliptical end seals to seal the combustion chamber. The power deriving combustion process takes place in said combustion chamber with cooling air intaking into the chamber and the exhaust therefrom passing thru slotted opening means in one same apex providing during exhaust a mixing of exhaust gases with fresh air. The rotors in all rotative positions are spaced from the side wall of the engine housing so as to permit circulation of cooling air along the inner face of the housing for engine and rotor cooling purposes and for accomplishing the cooling and scavenging of the exhaust gases.

Accordingly, it is an object of this invention to provide a rotary internal combustion engine having a unique valving means for the intake of combustion air and the exhaust and afterburning and cooling of combustion gases so as to provide an ecologically clean engine.

Another object of this invention is to provide a rotary engine having a unique sealing means between rotors.

Still another object of this invention is to provide unique boostings of intake air flow and air pressure.

Still another object of this invention is to provide an improved method of cooling all rotors.

Still another object of this invention is to provide a unique means of sealing between rotor ends and engine housing end plates.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a side elevational view of the engine

FIG. 2 is a perspective, disassembled view of one of the rotors and one type of end seal for the rotor.

FIG. 3 is a perspective, disassembled view of one of the rotors and another type of end seal for the rotor.

FIG. 4 is an enlarged fragmentary cross sectional view showing the detail of one type of the rotor end seal shown in FIG. 2.

FIG. 5 is an enlarged fragmentary cross sectional view showing the detail of another type of the rotor end seal shown in FIG. 3.

FIG. 6 is a longitudinal cross sectional view taken along the plane of the line 6—6 in FIG. 9 and looking in the direction of the arrows.

FIG. 7 is an enlarged fragmentary cross sectional view (taken along the plane of the line 7—7 in FIG. 2) showing the detail, on one apex of a rotor, of the inclined type position of flexible wiper seals.

FIG. 8 is an enlarged fragmentary cross sectional view (taken along the plane of the line 8—8 in FIG. 2) showing the detail, on one apex of a rotor, of the perpendicular type position of flexible wiper seals in flexing contact with an adjacent rotor, and showing the detail on the opposite apex of the same rotor, of the cooling air intake port communicating with the intake/exhaust valve slot.

FIG. 9 is a transverse cross sectional view taken along the plane of the line 9—9 in FIG. 1 showing the rotors thereof in one operative position.

FIG. 10 is a transverse cross sectional view taken along the plane of the line 10—10 in FIG. 1 showing the rotors in a position advanced from that shown in FIG. 9.

FIG. 11 is a transverse cross sectional view taken along the plane of the line 11—11 in FIG. 1 showing the rotors in a position advanced from that shown in FIG. 10.

FIG. 12 is a transverse cross sectional view taken along the plane of the line 12—12 in FIG. 1 showing the rotors in a position advanced from that shown in FIG. 11.

FIG. 13 is a group of four fragmentary enlarged cross sectional views showing the various flexible wiper seal end shapes.

FIG. 14 is a side elevational view of a rotor showing the detail of the slanted dual action intake/exhaust valve slots.

DETAILED DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The rotary engine depicted in the drawings consists of a cylindrical mid-section 16 connecting between two circular end plates 18 and 20. Each end plate has four rectangularly spaced bearing holes 22 that are co-axial with the bearing holes in the other end plate. A cylindrical crank case extension 24 is formed integrally on the outside of end plate 20 and supports a cover plate 26 with an outboard bearing 28 for the end of a drive shaft 30. Within the mid-section 16 are four elongated rotors of elliptical cross section with shafts at each end journalled in the end plates. The rotors are identified in clockwise progression around FIG. 9 as 32, 34, 36 and 38. The ends of the shafts journalled in plate 18 are hollow and form cooling air intake passages. The rotor shafts within the crank case extension 24 have crank pins 40 thereon with the pins on the shafts of rotors 32 and 36 appearing in FIG. 9. Drive shaft 30 is an extension of the shaft on rotor 32. The perspective view in FIG. 3 of rotor 36 in FIG. 9 is rotated 180 degrees from its position shown in FIG. 6.

A fuel injection tube 42 enters thru plate 18 to the center of the space between the four rotors. The elliptical rotors 32-38 rotate in a clockwise motion directions as indicated by the arrows 44 in FIG. 11.

All of the rotors 32-38 are of identical exterior elliptical cross section and are hollow, and all have cooling air intake ports 46, as shown most clearly in FIG. 8, communicating thru to the slanted dual purpose intake/exhaust valve slot 48, (on one apex of a rotor.) which acts as the exhaust valve during the exhaust cycle, as seen in FIG. 10, allowing for the mixing of fresh air with the exhaust gases, arrows 50, so as to provide a unique means for the afterburning, cooling, and scavenging of the combustion gases arrows 52. The slanted dual purpose intake/exhaust valve slot 48 which acts as an intake valve during the intake cycle, as seen in FIG. 12, allow for the slanted configuration of the slots 48 to impart to the intake air, (arrows 54,) a swirling, turbulent, mixing of the intake gases so as to improve the combustion of such gases. On the opposite apex of same rotors 32-38 are located a perpendicular flex wiper sealing means 56, as seen in FIG. 8 (in sliding contact,) or an inclined flex wiper sealing means 58, as seen in FIG. 7 thus sealing the central combustion chamber 60 which varies in size and volume as the rotors rotate.

Turning to FIG. 6 it will be seen that the crank pins 40 on the shafts in the crank case extension 24 are all received in bearings 62 carried by the corners of a connecting block 64. A plurality of connecting blocks 64 may also be used. This assures synchronized rotation of all of the rotors.

The ends of the elliptical rotors are sealed to the inner surfaces of the end plates 18 and 20 by end seals 65 as seen in FIG. 2 and FIG. 4 or by (other) end seals 66 as seen in FIG. 3 and FIG. 5 the seals having an elliptical contour. End seal 65 having an inner coil spring 68 providing a means of seating end seal 65 against end plate 18. End seal 66 having integral in its design a means of self-seating by compression of itself against end plate 18. The end seals are received in mating elliptical grooves 70 in each end of each rotor and seal against the end plates 18 and 20 as seen in FIG. 6.

A blower 72 with connecting conduits 74 providing cooling intake air (arrows 75) to the hollow shaft centers 76 of all four rotors 32-38 is conventionally illustrated in FIG. 1. A fuel injection pump 78 is conventionally illustrated at the end of the fuel injection pipe 42. Exhaust pipes 80 from the sides of the cylindrical mid-section 16 are shown.

Arrows 82 illustrate an interference height above the contour of the elliptical rotors by which the flex wiper seal tip must be to effectively flex during (sliding) contact with an adjacent rotor thus providing a sealing action. See FIG. 8.

Flex wiper seal slanted tip 84, flex wiper seal radius tip 86, flex wiper seal pointed tip 88 and flex wiper seal square tip 90 are illustrated in FIG. 13.

Arrows 92 illustrate a cooling intake air flow path providing cooling and scavenging of engine exhaust gases as illustrated in FIG. 9.

Arrows 94 illustrate exhaust gases moving thru intake/exhaust valve slot 48 past rotor end as seen in FIG. 8.

OPERATION

Starting with the rotors 32-34-36 and 38 as appearing in FIG. 6 and FIG. 9, the slanted dual purpose intake/exhaust valve slots 48 are just begining to exhaust the combustion chamber 60 which is at maximum volume. It is an important feature of this invention that this condition is an open air flow path indicated by the arrows 92 in FIG. 9 to provide rotor cooling, engine cooling, exhaust gases cooling, and exhaust gases scavenging. During the rotation of the rotors from position shown in FIG. 9 to the position of the rotors in FIG. 10 fresh cooling intake air is being added to and mixing with the exhaust gases, arrows 50, as the gases move past the rotors thru the valve slots thus providing a unique means for the afterburning of the exhaust gases, arrows 94, it is an important feature of this invention that this provision for afterburning occurs. It is also an important feature of this invention that this provision also encourages the drawing out of additional fresh air by the high velocity passing of the exhaust gases thru the slots past the ports thus providing for improved afterburning of the exhaust gases. FIG. 10 illustrates the rotors at about the middle of the exhaust cycle with mixing and afterburning already taking place. During the rotation of the rotors from the position of the rotors in FIG. 10 to the position of the rotors in FIG. 11 the exhaust cycle of the combustion chamber has been completed and the cooling intake air 54 is just begining to enter the combustion chamber. During the rotation of the rotors from the position of the rotors in FIG. 11 to their positions in FIG. 12 the cooling intake air flow from the blower 72 thru conduits 74 and thru hollow shafts centers 76 to the interiors of all rotors 32-38 and thru intake ports 46 and thru slanted valve slots 48, which direct and encourage and impart to the intake air, arrows 54, a swirling, turbulent, mixing of the intake gases, enters the combustion chamber 60, as shown half-way thru its intake cycle in FIG. 12. It is an important feature of this invention that the slanted valve slots direct and impart to the intake air a swirling turbulent motion so as to improve the ignition of the combustion chamber gases. During the rotation of the rotors from the position of the rotors in FIG. 12 to their positions in FIG. 9 the completion of the intake cycle occurs, during which the boosting of the cooling intake air flow and air pressure 75 by the centrifugal action of rotor rotation upon the entering intake air flow allows for a more improved efficient operation of the engine by supercharging combustion chamber gases and by better continous exhaust gases scavenging and additional rotors and engine cooling. It is an important feature of this invention that the boosting and supercharging of cooling intake air flow and air pressure is directed and increased by the centrifugal action of rotor rotation as seen in FIG. 8. At the completion of the intake cycle which is at the maximum volume of the combustion chamber 60 the perpendicular flex wiper seals 56 engage an adjacent rotor in (a sliding contact) sealing engagement thus sealing the combustion chamber, as seen in FIG. 8. It is an important feature of this invention that the (sliding contact) sealing action of the perpendicular flex wiper seals 56 provide sealing of the combustion chamber. Optionally an inclined flex wiper seal 58 will engage an adjacent rotor in (a sliding contact) sealing engagement thus sealing the combustion chamber, as seen in FIG. 7. It is an important feature of this invention that the (sliding contact) sealing action of the inclined flex wiper seals 58 provide sealing of the combustion chamber. Perpendicular flex wiper seals 56 and inclined flex wiper seals 58 have tips 84 which, as seen in FIG. 13, are extended above the elliptical contour, arrows 82, of the rotors so as to make (sliding) contact causing the flex wiper seals to bend and seal while in contact with an adjacent rotor. It is an important feature of this invention that the flex wiper seals having inclined tips 84 extending above the contour of the rotors seals the combustion chamber. Optionally flex wiper seals radius tips 86, flex wiper seals pointed tips 88, and flex wiper seals squared tips 90, as seen in FIG. 13 extended above the elliptical contour, arrows 82, of the rotors seal while in (sliding) contact with an adjacent rotor. It is an important feature of this invention that the flex wiper seals having radius tips 86, pointed tips 88, or squared tips 90 extending above the contour of the rotors seals the combustion chamber. At the completion of the intake cycle the compression cycle begins with with the sealing action of the flex wiper seals making (sliding) contact and during further rotation of the rotors the intake air is compressed in the combustion chamber until its minimum volume is attained at which time fuel injection takes place and combustion and a power stroke cycle occurs which drives the rotors out to maximum combustion chamber volume. as seen in FIG. 9 to begin another exhaust cycle.

Sealing between the rotors ends and the inner surfaces of the end plates 18 and 20 is end seal 65 located in mating elliptical groves 70 in each end of each rotor, an inner coil spring 68 providing a means of seating end seal 65 against end plates 18 and 20. It is an important feature of this invention that the end seal 65 with coil spring provide sealing between the rotors and end plates, as seen in FIG. 4. Optionally sealing between the rotors ends and the inner surfaces of the end plates 18 and 20 is end seal 66 located in mating elliptical groves 70 in each end of each rotor having integral in itself a means of self-seating and sealing by compression of itself against end plates 18 and 20, as seen in FIG. 5. It is an important feature of this invention that the end seal 66 integrally self-seating by compression of itself provide sealing between the rotors and end plates.

It is to be understood that the invention is not to be limited to the details aboue given but may be modified within the scope of the following appended claims.

What is claimed to be new and what is desired to be secured by Letters Patent is described in the following claims:

1. A rotary engine of the internal combustion type comprising a group of at least four rotors of elliptical cross sections and central shafts extensions on each end with the shaft extensions journalled to rotate about parallel axes in two end plates, all four rotors having hollow interiors and one of the shaft extensions on each of said rotors having hollow interiors forming an opening to the interior of their rotors said rotors defining a combustion chamber in all rotative positions of the rotors, said chamber varying in volume depending upon the rotational position of the rotors and having a maximum volume at a first rotor position and a minimum volume at a second rotor position, an outer body enclosing said group of rotors in spaced relation and closed on said end plates forming an exhaust pipe,
a means of connecting the ends of the shaft extensions of said rotors exteriorly of
an end plate for equal and simultaneous rotation,
an exhaust slot means formed in all of said hollow rotors at a first apex of each rotor,
an intake port means formed in all of said hollow rotors at the first apex of each rotor,
a means of sealing between adjacent rotors formed at a second apex of each rotor while rotors are in a compression cycle and power cycle,
a means of sealing between rotor ends and end plates,
and a fuel injector nozzle with an associated fuel pump projecting through one of said end plates to the space between said rotors, and a blower means connected to deliver air to said hollow rotors shafts.

2. An internal combustion engine as defined in claim 1 in which there are four similar hollow rotors with intake ports formed interiorly thru to the exhaust slot means.

3. An internal combustion engine as defined in claim 1 in which there are four similar hollow rotors with slanted exhaust slots located at one apex of each rotor.

4. An internal combustion engine as defined in claim 1 in which there are four similar hollow rotors with a formed flexible means of sealing, while in sliding contact with an adjacent rotor, encompassing one apex of each rotor longitudinally.

5. An internal combustion engine as defined in claim 1 in which there are elliptical grooves formed in the ends of said rotors adjacent to their peripherices and end seals of elliptical shape having a horseshoe shape cross section compressed in said grooves by said end plates.

6. An internal combustion engine as defined in claim 1 wherein said outer body enclosing said group of rotors being spaced from the sides of said rotors in all rotative positions of the rotors defined by a housing inner face, said rotor sides and housing inner face defining continually open gases passage means from rotors intake ports and exhaust slots to said exhaust pipe.

7. An internal combustion engine as defined in claim 3 wherein said slot means includes a plurality of spaced slots formed in the apex of each rotor in a slanted direction to impart to the intake air, during the intake cycle, a swirling, turbulent, mixing of the intake gases.

8. An internal combustion engine as defined in claim 2 wherein said port means include a plurality of spaced ports formed in the apex of each rotor in relation to slots in the first apex of each rotor to encourage the mixing of fresh air with the exhaust gases during the exhaust cycle.

9. An internal combustion engine as defined in claim 3 wherein said slot means includes a plurality of spaced slots formed in the apex of each rotor in relation to intake ports in the first apex of each rotor to encourage the mixing of fresh air with the exhaust gases during the exhaust cycle.

10. An internal combustion engine as defined in claim 4 in which there are four similar rotors with a perpendicularly formed flexible means of sealing, while in sliding contact with an adjacent rotor, encompassing one apex of each rotor longitudinally.

11. An internal combustion engine as defined in claim 4 in which there are four similar rotors with a slantedly formed flexible means of sealing, while in sliding contact with an adjacent rotor, encompassing one apex of each rotor longitudinally.

12. An internal combustion engine as defined in claim 1 in which there are elliptical grooves formed in the ends of said rotors adjacent to their peripherices and end seals of elliptical shape having a horseshoe shape cross section compressed in said groves and against said end plates with an internal coil spring.

13. An internal combustion engine as defined in claim including a blower means is connected to conduits supplying cool air flow to all four rotors.

14. An internal combustion engine as defined in claim 13 in which all four rotors during 270° degrees of their rotation form an open air flow path between the blower and the exhaust pipe.

15. An internal combustion engine as defined in claim 2 in which the boosting of intake air flow and air pressure by the centrifugal action of all four rotors rotation upon the entering intake air occurs.

16. An internal combustion engine as defined in claim 4 in which the rotors formed flexible means of sealing have slanted tips.

17. An internal combustion engine as defined in claim 4 in which the rotors formed flexible means of sealing have radius tips.

18. An internal combustion engine as defined in claim 4 in which the rotors formed flexible means of sealing have pointed tips.

19. An internal combustion engine as defined in claim 4 in which the rotors formed flexible means of sealing have square tips.

20. A rotary engine of the internal combustion type comprising a group of at least four rotors of elliptical cross sections and central shafts extensions on each end with the shaft extensions journalled to rotate about parallel axes in two end plates, all four rotors having hollow interiors and one of the shaft extensions on each of said rotors having hollow interiors forming an opening to the interior of their rotors said rotors defining a combustion chamber in all rotative positions of the rotors, said chamber varying in volume depending upon the rotational position of the rotors and having a maximum volume at a first rotor position and a minimum volume at a second rotor position, an outer body enclosing said group of rotors in spaced relation and closed on said end plates forming an exhaust pipe, a means of connecting the ends of the shaft extensions of said rotors exteriorly or an end plate for equal and simultaneous rotation, an exhaust slot means formed in all of said hollow rotors at a first apex of each rotor, an intake port means formed in all of said hollow rotors at the first apex of each rotor as the exhaust slot is formed, a means of sealing between adjacent rotors formed at a second apex of each rotor while rotors are in a compression cycle and power cycle, a means of sealing between rotor ends and end plates, and a fuel injector nozzle with an associated fuel pump projecting through one of said end plates to the space between said rotors.

21. An internal combustion engine as defined in claim 20 wherein said port means includes a plurality of spaced ports formed in the first apex of each rotor in relation to exhaust slots in the first apex of each rotor to encourage the drawing out of fresh air by the high velocity passing of the exhaust gases thru the slots past the ports.

* * * * *